United States Patent [19]

Carmon et al.

[11] Patent Number: 5,291,468
[45] Date of Patent: Mar. 1, 1994

[54] METHOD AND APPARATUS FOR SYNCHRONIZING THE READOUT OF A SEQUENTIAL MEDIA DEVICE WITH A SEPARATE CLOCKED DEVICE

[75] Inventors: Donald E. Carmon, Durham; William G. Crouse, Raleigh, both of N.C.

[73] Assignee: International Business Machines Corporation, Armonk, N.Y.

[21] Appl. No.: 760,653

[22] Filed: Sep. 16, 1991

[51] Int. Cl.$^5$ ............................................. G11B 20/10
[52] U.S. Cl. ........................................ 369/47; 369/60; 369/48; 395/250
[58] Field of Search ............ 360/51; 369/47, 60, 369/48; 395/250, 400, 425

[56] References Cited

U.S. PATENT DOCUMENTS

| | | | |
|---|---|---|---|
| 4,413,289 | 11/1983 | Weaver et al. | 360/51 |
| 4,536,864 | 8/1985 | Van Rosmalen | 369/44.32 |
| 4,791,622 | 12/1988 | Clay et al. | |
| 4,802,152 | 1/1989 | Markvoort et al. | |
| 4,841,513 | 6/1989 | Farhangi et al. | |
| 4,872,073 | 10/1989 | Fincher et al. | 360/51 |
| 5,103,467 | 4/1992 | Bedleck et al. | 369/60 |

*Primary Examiner*—Aristotelis Psitos
*Assistant Examiner*—P. W. Huber
*Attorney, Agent, or Firm*—Jerry W. Herndon

[57] ABSTRACT

A method and apparatus for controlling the readout rate of information from a sequential storage medium, such as a CD-ROM, to maintain synchronism between the device containing the medium and an independent receiver receiving the information. Information is loaded from the media into a buffer at a rate controlled by pulses from a device clock. Information is unloaded from the buffer for utilization by the receiver independently of the loading of the buffer. The amount of free space available in the buffer is measured as information is loaded into the buffer. The rate of the clock is dynamically adjusted in response to the amount of free buffer space to maintain the full state of the buffer within predetermined limits. In this manner, the buffer never empties or fills in response to the unloading by the independent receiver.

7 Claims, 3 Drawing Sheets

METHOD AND APPARATUS FOR SYNCHRONIZING THE READOUT OF A SEQUENTIAL MEDIA DEVICE WITH A SEPARATE CLOCKED DEVICE

TECHNICAL FIELD

The invention relates to the general field of multimedia applications. In particular, it relates to the use of mass storage devices, such as compact disk ROMS (CD-ROMS), for the continuous presentation of information, audio, video and the like, stored on the devices to computers and the like.

BACKGROUND OF THE INVENTION

A sequential media device, such as a CD-ROM, when interfaced to a separately clocked receiving device for readout, presents a potential problem in the synchronizing of the data transfer between the devices. The problem arises because the sequential device is outputting continuous information at its own nominal speed, while the receiving device is independently running at its own speed. Thus, there can arise buffer overflow or buffer empty conditions between the devices. For short term readouts, the standard solution is to make the buffer between the devices elastic. The elastic buffer can feasibly be made large enough to absorb slight differences in the clock rates of the sequential device and the receiving device. This is the technique disclosed in U.S. Pat. No. 4,791,622, OPTICAL DATA FORMAT EMPLOYING RESYNCHRONIZABLE DATA SECTORS, issued to Clay et al on Dec. 13, 1988, and U.S. Pat. No. 4,841,513, SEQUENTIAL BUFFER DEVICE, issued to Farhangi et al on Jun. 20, 1989. As the continuous time interval of the readout increases, such as might be the case in multimedia presentations, the required size of the elastic buffer becomes prohibitive. If the buffer empties or fills during playback because of the differences in the device clocks, the presentation will be marred, either by delays or by the loss of information. This manifests itself as intolerable distortion in presentations involving audio or video information.

It is possible to use other conventional solutions, such as phase-locked loops or servos that synchronize the clock rate of the sequential device to the read commands of the receiving device. However, such solutions are complex and expensive, especially when it is considered that the external receiving device may be a PC or like device requesting information in sectors and at less than precisely periodic intervals.

U.S. Pat. No. 4,802,152, which issued to Markvoort et al on Jan. 31, 1989, shows another conventional interface in which the sequential device provides a clock to a host controller to synchronize the data output with the host. However, this solution is not possible or desirable in all environments.

The present trend for attaching a sequential device, such as a CD-ROM, to a computer is through the Small Computer System Interface (SCSI). This interface allows the computer or host to request data from the CD-ROM in a manner similar to that used by "floppy" and "hard" disk drives. The CD-ROM differs, however, from disk drives in that its very high density of data storage does not allow it to have high speed random access of its data. The CD-ROM takes hundreds of milliseconds to "seek" to a particular sector or data. While the SCSI interface can be used to position a CD-ROM at the beginning of a continuous playback segment, the SCSI interface does not provide a means therefore for the CD-ROM and receiver to remain synchronized.

In the case of interfacing a CD-ROM to host computer or PC, the host audio/visual output functions have no direct way to share a clock with the CD-ROM. The CD-ROM, in its present embodiments, can be requested to output data for many minutes while the host is routing the data to a speaker and display. The CD-ROM data rate is defined by its clock, while the host runs at its independent clock rate. These rates will not be precisely the same and over the period of the presentation the CD-ROM may output too much data or not enough. This then is a specific illustration of the general problem summarized above.

SUMMARY OF THE INVENTION

The invention provides a simple solution to the above problems when separate device clocks are required by dynamically adjusting the internal clock rate of the sequential device. The invention contemplates a method and apparatus for controlling the readout rate of information from a sequential storage medium to maintain synchronism between the device containing the medium and a receiver receiving the information. Information is loaded from the media into a buffer at a rate controlled by pulses from a device clock. Information is unloaded from the buffer for utilization by the receiver independently of the loading of the buffer. The amount of free space available in the buffer is measured as information is loaded into the buffer. The rate of the clock is dynamically adjusted in response to the amount of free buffer space to maintain the fill state of the buffer within predetermined limits. In this manner, the buffer never empties or fills in response to the unloading by the independent receiver.

In a preferred embodiment, clock pulses are suppressed to slow the rate of loading into the buffer by the device when the buffer is filled to greater than a predefined amount. An alternative embodiment discloses the insertion of clock pulses into the pulse stream from the clock to increase the rate of loading into the buffer when the buffer is filled to less than a predefined amount. In both embodiments, it is easiest to determine if the buffer is greater than or less than half full. Also in both embodiments, write and read addresses are maintained for loading and unloading the buffer. Each time a selected one of the write or read addresses passes the midpoint of of the buffer, the most significant bit of the other read or write buffer address is stored. This stored signal determines if the buffer is more or less than half full at that point in time on this pass through the buffer. In the preferred embodiment, when the buffer is filled to greater than half, other circuitry operates to slow the effective internal clock rate of the sequential device by suppressing clock pulses. In the alternative embodiment, clock pulses are dynamically inserted into the clock stream to increase the speed of loading the buffer when the stored signal indicates that the buffer is less than half full.

The invention may be conveniently used to modify a conventional CD-ROM for continuous play of material to a PC or other like independent receiver. For this use, preferably, the standard clock rate of the commerically available CD-ROM is increased so that the buffer of the CD-ROM naturally tends to fill. In this case, the pulse suppressing embodiment then maintains the buffer fill state to approximately the half way point. Alternatively, the effective conventional crystal rate of a commerically available CD-ROM may be decreased so that the buffer tends to empty and the clock pulse insertion embodiment is then used to maintain the fill state of the buffer at approximately the half way point.

DETAILED DESCRIPTION

Figure 1:
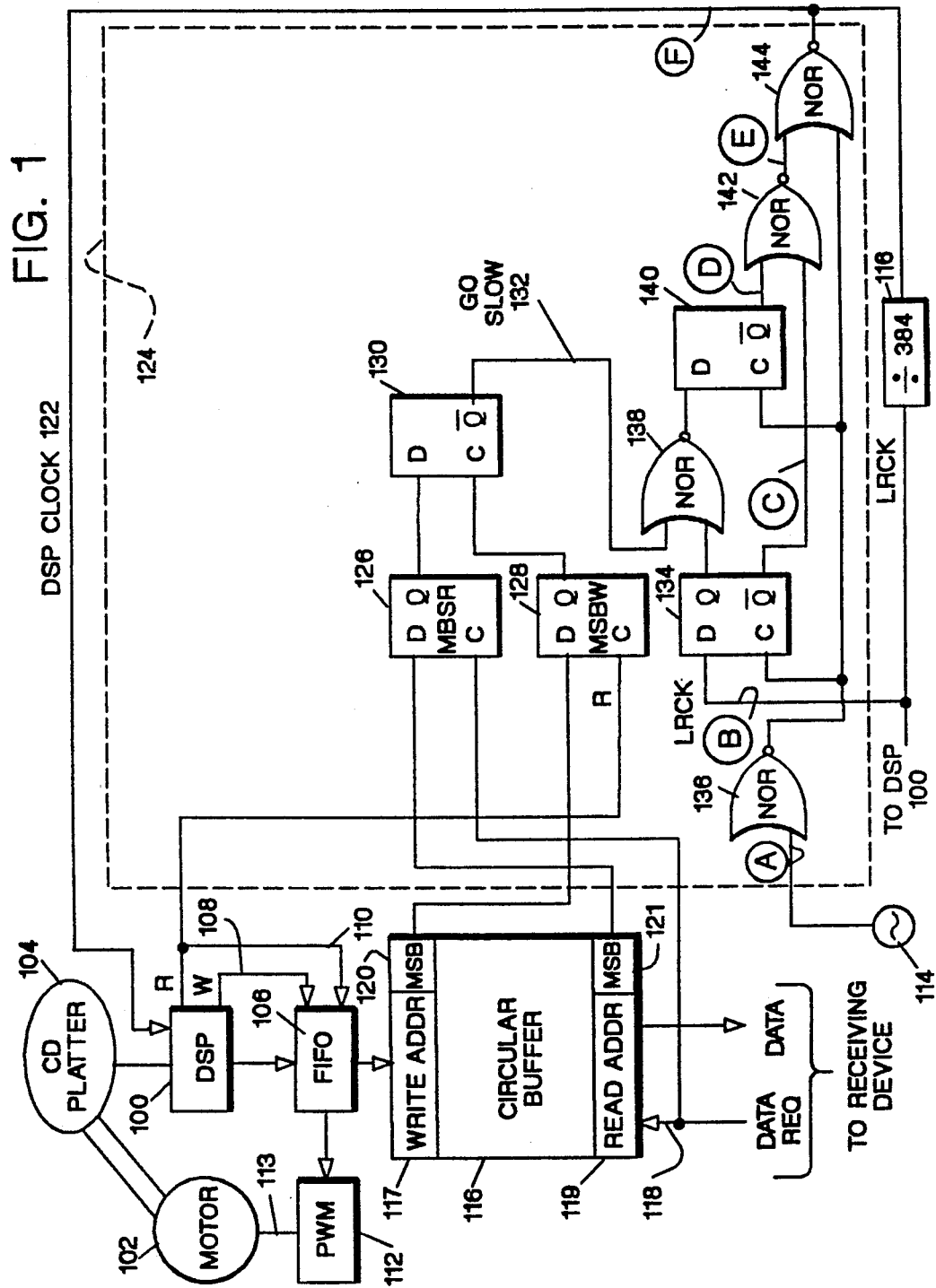
FIG. 1 shows the conventional circuits of a commercially available CD-ROM, and additional circuitry designed in accordance with the invention to control the clock rate of the conventional circuits by clock pulse suppression, so as to maintain an effective data output rate in synchronism with a separate receiving device.

FIG. 1 shows the circuits of a conventional CD-ROM, and the preferred embodiment of the invention that controls the effective clock rate of a sequential device to maintain synchronization with an independent data receiver. The sequential device in FIG. 1 is a CD-ROM. However, it is recognized that the invention may be used in other types of sequential devices as well. The conventional CD-ROM circuits are first discussed. A Digital Signal Processor (DSP) 100 controls most of the functions of the CD-ROM. A motor 102 controls the spin rate of a platter 104 on which the data is optically stored. DSP 100 takes data from the platter 104 and puts it into a first-in-first-out (FIFO) buffer 106 at the rate at which the platter 104 provides it. Write signals on W lead 108 from DSP 100 control the writing of data into FIFO 106. DSP 100 removes data from FIFO 106 under control of read signals on the R lead 110.

FIFO 106 is large enough to absorb short term variations in the rates of signals on the R and W leads 110 and 108. To minimize these short term variations, the speed of motor 102 is controlled by a signal generated by a pulse width modulator (PWM) circuit 112. This pulse width of signals on PWM output lead 113 control the motor speed. The pulse are determined by the amount of data in FIFO 106. The pulse width is increased to speed-up the motor as the FIFO empties and decreased to slow the motor as the FIFO fills. In commercially available CD-ROMs, the pulse width may vary in increments of from 1 to 91 of a total of 92 units. The pulse rate from PWM 112 is 88.2 KHz per second. This conventional arrangement allows DSP 100 to track the rate at which the data is provided by the platter 104 if that rate is reasonably constant.

An oscillator 114, driven by a crystal (not shown), controls the CD-ROM. The pulse rate of oscillator 114 is typically 16.9344 MHz. A dividing circuit 116 divides the pulse frequency provided by oscillator 114 by 384 to achieve a nominal 44.1 KHz rate on lead LRCK (Left-Right clock) at which the data is removed from the FIFO 106 under control of DSP 106 in conventional CD-ROMs. In many CD-ROMs, the data removed from the FIFO 106 is placed in another buffer 116 (typically 32 or 64K bytes in size). Associated with buffer 116 are buffer read and write addresses which are contained in write and read address registers 117 and 119, respectively. Buffer 116 is written and read in a circular manner; that is, the read and write addresses in registers 117 and 119 increment and wrap from highest to lowest when the end of the buffer is reached. The data in buffer 116 is written at a rate roughly defined by the frequency of oscillator 114, divided by 384. Actually, two samples are written for each LRCK period, one for a stereo left channel and a second for the right channel. Buffer 116 is read at rate defined by the receiver request rate on lead 118.

In accordance with the invention, the clock frequency of oscillator 114 is placed slightly higher than that of a conventional CD-ROM. The reason for this will become apparent. A crystal frequency of 16.9565 MHz has been found to operate satisfactorily. Lead LRCK is intercepted by the circuit 124 for the purpose of suppressing clock signals from oscillator 114 to DSP 100 when necessary to maintain synchronization between the sequential device and the receiver. To this end, circuit 124 controls the generation of clock signals on DSP CLOCK lead 122 to DSP 100 based on the amount of data in buffer 116. The MSB (most significant bit) 120 of the write address of buffer 116 is saved in delay flip-flop MSBW (128) each time a write of buffer 116 is executed. Similarly, the MSB 121 of the read address is saved in delay flip-flop MSBR (126) each time a read of buffer 116 is executed. The R signal on lead 110 from DSP 100 operates as a write enable from FIFO 106 to buffer 116 and as an enabling signal to delay flip-flop 128. The DATA REQ signal on lead 118 operates as an enable of flip-flop 126. When the MSBW flip-flop switches to a set state, the state of flip-flop MSBR is clocked into another delay flip-flop 130. The complemented output Q' of flip-flop 130 (lead 132) controls the effective rate of clock signals on lead 122 to DSP 100. The state of lead 132 (GOSLOW) indicates whether buffer 116 is more or less than half full. This is true because the state of flip-flop MSBR reflects whether or not the read address of buffer 116 is more or less than the buffer midpoint when the most significant bit 120 of the buffer write address switches to the high state (also the midpoint of buffer 116). When the write address reaches the midpoint of buffer 116, the state of lead 132 (GOSLOW) goes high if the present read address is at less than the midpoint of buffer 116 and low if the read address is greater the midpoint of the buffer. Therefore, the GOSLOW signal may change each time the write address passes the buffer 116 midpoint.

The GOSLOW signal intercepts the crystal clock from oscillator 114 and controls the clock pulses on lead 122 to DSP 100 when necessary. Ordinarily, when the buffer 116 is less than half full, circuit 124 merely passes the clock signal from oscillator 114 directly to the DSP 100 on lead 122. When the buffer 116 becomes greater than half full, circuit 124 operates to suppress one clock pulse from oscillator 114 on each rising edge of the signal LRCK. This causes DSP 100 to decrease slightly the rate at which it loads FIFO 106, which in turn slows the speed of motor 102 to slow the rate at which the platter 104 supplies data to DSP 100. Accordingly, buffer 116 is then written at a rate slightly less than that at which it is read and the buffer will begin to empty until such time as it is less than half full. Circuit 124 then ceases to suppress clock pulses from oscillator 114.

Figure 2:
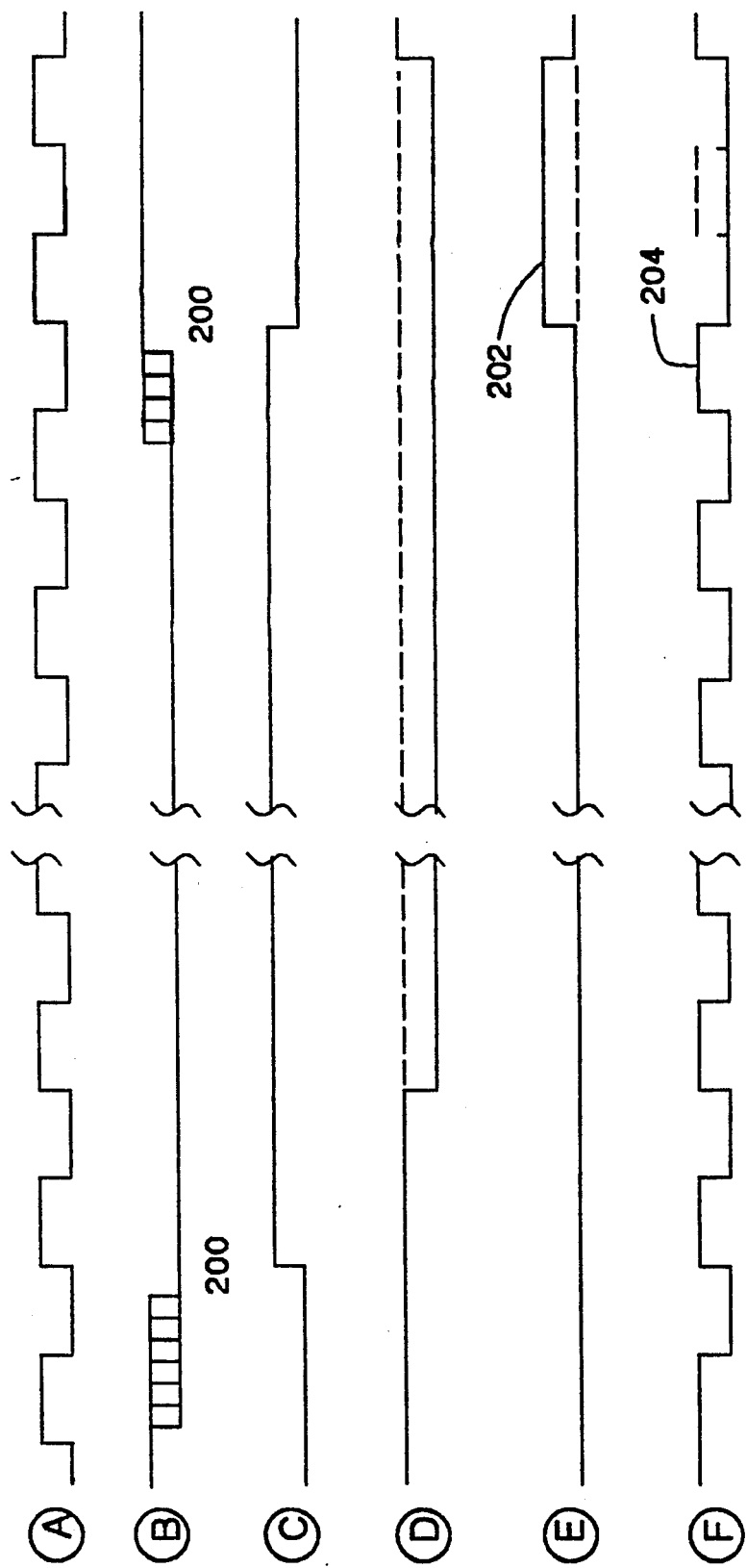
FIG. 2 shows illustrative pulse waveforms at various points within the circuit of FIG. 1.

To accomplish the above, the signal LRCK is routed to the delay input D of delay flip-flop 134. In FIG. 2, the clock pulse stream from oscillator 114 is shown as A. The LRCK signal is shown as B. The pulse edges at 200 of stream B represent potential phase differences in the pulses introduced by circuit 116 and the pulse suppression circuitry. Stream C in FIG. 2 represents the state of flip-flop 134 (LRCK' delayed by one clock time). Pulse stream D is the output of flip-flop 140. The combination of flip-flops 134, 140 and NOR gate 138 operate as a pulse edge detector. The Q output of flip-flop 130, controls whether NOR gate 138 is enabled or not. The Q' outputs of flip-flops 134 and 140 are routed as inputs to NOR gate 142. When either of these leads are high, the output of gate 142 becomes low, thus enabling NOR gate 144 to pass the clock signal from oscillator 114. However, when both the input leads to NOR gate 142 are low, indicating that a clock pulse should be suppressed, the resulting high output of gate 142 disables NOR gate 144 and suppresses one clock pulse at the output of gate 144. This is shown at 202 of pulse stream E, which suppresses the one clock pulse shown dotted at 204 of pulse stream F. A single clock pulse will continue to be suppressed on each cycle through the midpoint of buffer 116 as long as the buffer remains more than half full. The result of this for an oscillator 114 crystal cut for a nominal frequency of 16.9565 MHz. is that the buffer 116 write period is increased from a nominal period of times the oscillator 114 clock rate to 385 times the clock rate. The result for this preferred embodiment is a CD-ROM that runs 0.13% faster than a conventional CD-ROM when the buffer 116 is less than half full and 0.13% slower when the buffer 116 is more than half full.

Test results show that for data request rates from a receiver of nominal plus or minus 0.13% of the CD-ROM crystal frequency, the buffer 116 fills to half its capacity and remains there with a jitter of less than 0.3% of the full buffer capacity. Short term burst rate variations of receiver data requests are easily covered by the 32K buffer. The long term variations will be tracked by the GOSLOW speed control. All of the above frequencies and counts can, of course, be varied depending on a specific implementation or need.

Figure 3:
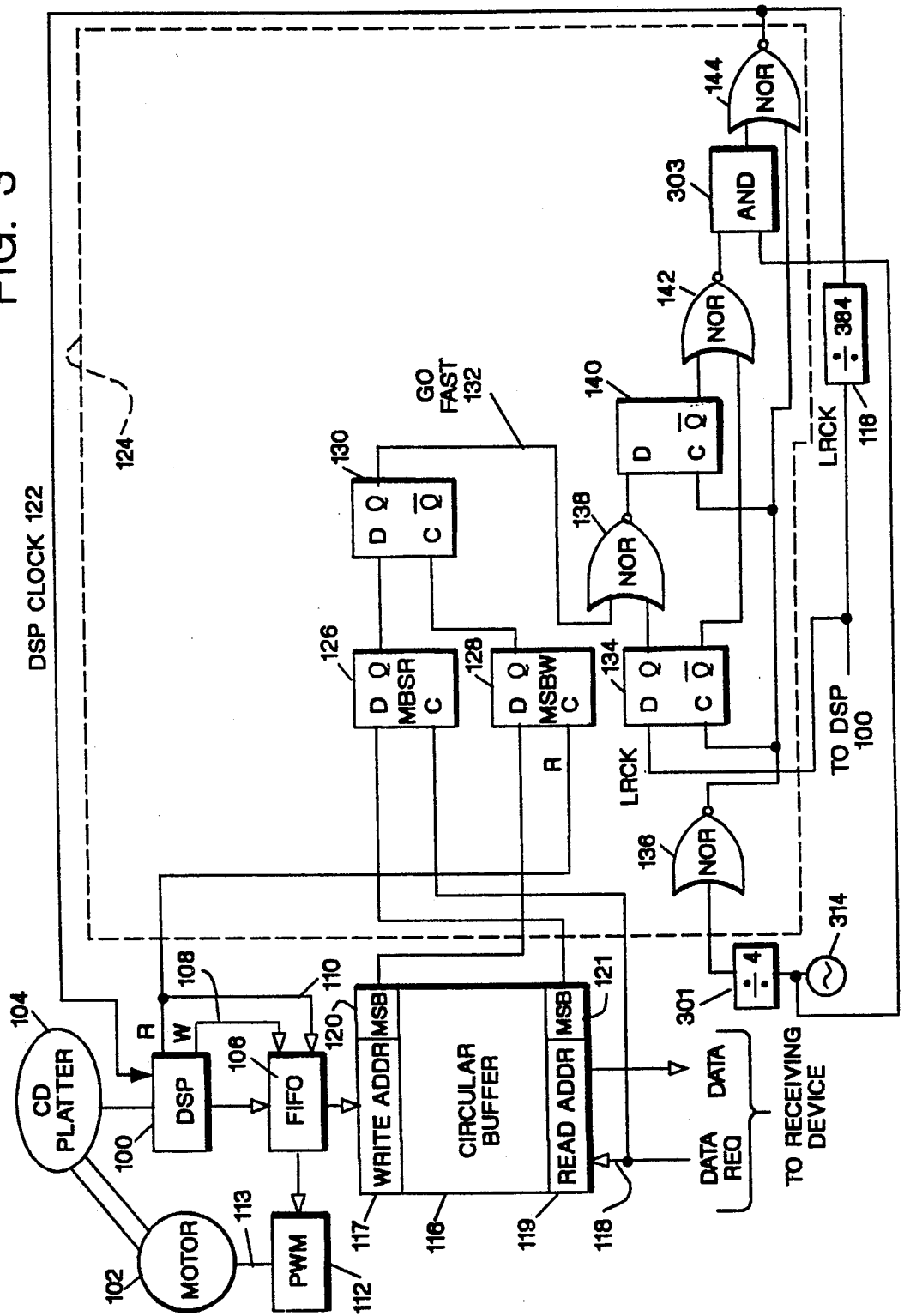
FIG. 3 shows an alternative embodiment of the invention, in which additional clock pulses are stuffed into the clock stream of a CD-ROM to cause the device to run faster, also to maintain an effective data output rate in synchronism with a separate receiving device.

FIG. 3 shows an alternative embodiment in which clock pulses to DSP 100 are stuffed, rather than suppressed. FIG. 3 is very similar to FIG. 1, except for four changes. First the frequency of oscillator 314 is increased by a factor of approximately four to about 67.65 MHz. This results in narrower clock pulses to simplify the pulse stuffing. Second, this clock frequency from oscillator 314 is reduced again to about 16.91 MHz. by the addition of divide by four circuit 301. Notice that this reduced clock rate of 16.91 MHz.is about 0.13% less than the nominal conventional rate of a CD-ROM. This causes the CD-ROM to run slightly slower under normal conditions, so that buffer 116 tends to empty and the clock rate need only be increased by clock stuffing when needed further to fill the buffer 116. Third, the GOSLOW signal from FIG. 1 is changed to a GO-FAST signal by obtaining it from the Q output of flip-flop 130, rather than the Q' output. Fourth, an AND gate is inserted between NOR gates 142 and 144, as shown in FIG. 3 to insert pulses from oscillator 314 into the clock stream to DSP 100 when the buffer 116 is less than half full.

It is to be understood that the above described arrangements are merely illustrative of the application of principles of the invention and that other arrangements may be devised by workers skilled in the art without departing from the spirit and scope of the invention. For example, in view of the above teaching, a circuit can be easily devised in which both clock pulse stuffing and suppression can be combined to maintain synchronization of the media and a receiver.

We claim:

1. A method of synchronizing the readout rate of information from a sequential storage medium with the utilization of the data by an independent device, comprising the steps of:
   loading the information from the media into a buffer in a circular fashion at a rate controlled by pulses from a clock,
   unloading information from the buffer for utilization in a circular fashion at a rate that is independent of the loading of the buffer,
   maintaining write and read addresses for loading and unloading information from the buffer,
   each time a selected one of the write or read addresses passes the midpoint of the buffer, storing the most significant bit of the other read or write address, and,
   adjusting the rate of the clock in response to the stored most significant bit.

2. The method of claim 1 wherein the step of adjusting further comprises
   suppressing a clock pulse each time a write is performed into the buffer in response to the state of the most significant bit indicating a buffer greater than half full.

3. The method of claim 1 wherein the step of adjusting further comprises
   inserting a clock pulse each time a write is performed into the buffer in response to the state of the most significant bit indicating a buffer less than half full.

4. Apparatus for controlling the readout rate of information from a sequential storage medium, comprising:
   a buffer for loading information from the sequential device,
   write and read address registers for loading and unloading information to and from the buffer in a circular fashion,
   a clock for controlling the rate of loading information into the buffer,
   first means activated by a write of information into the buffer for storing the most significant bit of the buffer write address,
   second means activated by a read of information from the buffer for storing the most significant bit of the buffer read address,
   third means responsive to the first and second storing means for storing a signal once on each pass, selected from a write or a read pass, through the buffer indicating whether the buffer is greater than half full, and
   means responsive to the said stored signal for adjusting the rate of the clock to maintain the amount of free buffer space within predetermined limits.

5. The apparatus of claim 4 wherein the adjusting means further comprises
   means responsive to the signal from the third storing means for suppressing a clock pulse on each write into the buffer.

6. Apparatus for controlling the readout rate of information from a sequential storage medium, comprising:
   a buffer for loading information from the sequential device, write and read address registers for loading and unloading information to and from the buffer in a circular fashion, a clock for controlling the rate of loading information into the buffer, first means activated by a write of information into the buffer for storing the most significant bit of the buffer write address, second means activated by a read of information from the buffer for storing the most significant bit of the buffer read address, third means responsive to the first and second storing means for storing a signal once on each pass, selected from a write pass or a read pass, through the buffer indicating whether the buffer is less than half full, and means responsive to the said stored signal for adjusting the rate of the clock to maintain the amount of free buffer space within predetermined limits.

7. The apparatus of claim 6 wherein the adjusting means further comprises means responsive to the signal from the third storing means for inserting a clock pulse on each write into the buffer.

* * * * *